United States Patent
Perkins et al.

(10) Patent No.: US 9,440,744 B2
(45) Date of Patent: Sep. 13, 2016

(54) DECOMPRESSION PANEL ASSEMBLY AND METHOD OF EQUALIZING AIR PRESSURE DIFFERENTIAL

(71) Applicant: THE BOEING COMPANY, Seal Beach, CA (US)

(72) Inventors: Thomas Seth Perkins, Renton, WA (US); Allan A. Loken, Kent, WA (US); Robert J. Christian, Tacoma, WA (US); James Pease, Kent, WA (US); Sara Beth Cromyak, Seattle, WA (US)

(73) Assignee: The Boeing Company, Chicago, IL (US)

( * ) Notice: Subject to any disclaimer, the term of this patent is extended or adjusted under 35 U.S.C. 154(b) by 46 days.

(21) Appl. No.: 14/228,554

(22) Filed: Mar. 28, 2014

(65) Prior Publication Data
US 2015/0108274 A1   Apr. 23, 2015

Related U.S. Application Data

(60) Provisional application No. 61/891,954, filed on Oct. 17, 2013.

(51) Int. Cl.
| | | |
|---|---|---|
| *B64C 1/14* | (2006.01) | |
| *B64D 13/00* | (2006.01) | |
| *B64C 1/18* | (2006.01) | |
| *B64C 1/00* | (2006.01) | |

(52) U.S. Cl.
CPC .............. *B64D 13/00* (2013.01); *B64C 1/18* (2013.01); *B64C 2001/009* (2013.01)

(58) Field of Classification Search
CPC ... B64C 2001/009; B64C 1/18; B64C 13/00; B64C 25/00
See application file for complete search history.

(56) References Cited

U.S. PATENT DOCUMENTS

| | | |
|---|---|---|
| 1,081,195 A | 12/1913 | Austin |
| 1,978,642 A | 10/1934 | MacLean |
| 2,395,233 A | 2/1946 | Richardson |
| D153,487 S | 4/1949 | Adam |
| 2,859,841 A | 11/1958 | Reed, Jr. et al. |

(Continued)

FOREIGN PATENT DOCUMENTS

| | | |
|---|---|---|
| DE | 114647 C | 3/1899 |
| DE | 1753273 A1 | 3/1971 |

(Continued)

OTHER PUBLICATIONS

International Search Report and Written Opinion of International Application No. PCT/US2014/040844, Feb. 20, 2015, 11 pages.

(Continued)

*Primary Examiner* — Philip J Bonzell
(74) *Attorney, Agent, or Firm* — Armstrong Teasdale LLP (57) ABSTRACT

Decompression panel assemblies and methods of equalizing air pressure differential are provided. The decompression panel assembly includes a panel comprising an opening defined therein, a vent cover coupled across the opening, and a latching mechanism. The vent cover is configured to move between a first position and a second position. The latching mechanism is configured to maintain the vent cover in the first position when a pressure differential across the panel is below a predetermined value and facilitate the vent cover moving to the second position when the pressure differential across the panel exceeds the predetermined value.

19 Claims, 6 Drawing Sheets

(56) References Cited

U.S. PATENT DOCUMENTS

| | | |
|---|---|---|
| 2,925,050 A | 2/1960 | Candlin, Jr. et al. |
| 3,571,977 A | 3/1971 | Abeel |
| 4,033,247 A | 7/1977 | Murphy |
| 4,066,212 A | 1/1978 | Sonneville |
| 4,133,852 A | 1/1979 | Dinicolantonio et al. |
| 4,353,503 A | 10/1982 | Duchemin |
| 4,390,152 A | 6/1983 | Jorgensen |
| 4,432,514 A | 2/1984 | Brandon |
| 4,432,538 A | 2/1984 | Sequin |
| RE32,554 E | 12/1987 | Murphy |
| 4,728,235 A | 3/1988 | Patti |
| 4,819,548 A | 4/1989 | Horstman |
| 4,899,960 A | 2/1990 | Hararat-Tehrani et al. |
| 5,025,987 A | 6/1991 | Kotecki et al. |
| 5,046,686 A | 9/1991 | Carla et al. |
| 5,085,017 A | 2/1992 | Hararat-Tehrani |
| 5,118,053 A | 6/1992 | Singh et al. |
| 5,137,231 A | 8/1992 | Boss |
| 5,331,119 A | 7/1994 | Leger et al. |
| D351,903 S | 10/1994 | Whitley, II |
| D353,193 S | 12/1994 | Porter |
| D358,205 S | 5/1995 | Ruhland |
| 5,606,829 A | 3/1997 | Hararat-Tehrani |
| D390,948 S | 2/1998 | Meyer |
| D393,708 S | 4/1998 | Assadi |
| 5,792,230 A | 8/1998 | Moore et al. |
| D402,356 S | 12/1998 | Hodge |
| 5,871,178 A | 2/1999 | Barnett et al. |
| 6,029,933 A | 2/2000 | Holman et al. |
| 6,129,312 A | 10/2000 | Weber |
| 6,129,856 A | 10/2000 | Jung et al. |
| 6,261,042 B1 | 7/2001 | Pratt |
| 6,264,141 B1 | 7/2001 | Shim et al. |
| 6,290,445 B1 | 9/2001 | Duran et al. |
| D456,066 S | 4/2002 | Ching |
| 6,435,455 B1 | 8/2002 | Holman et al. |
| 6,450,415 B1 | 9/2002 | Kirchner et al. |
| D466,605 S | 12/2002 | Ziegler |
| D469,889 S | 2/2003 | O'Hagin |
| 6,601,356 B2 | 8/2003 | Snyder |
| 6,702,230 B2 | 3/2004 | Movsesian et al. |
| 6,817,941 B1 | 11/2004 | Gatov |
| D504,172 S | 4/2005 | O'Hagin |
| D517,193 S | 3/2006 | Calkins |
| 7,021,855 B2 | 4/2006 | Hardtke et al. |
| 7,207,524 B2 * | 4/2007 | Puschmann ............... B64C 1/14 116/70 |
| 7,234,894 B1 | 6/2007 | Flury |
| 7,303,800 B2 | 12/2007 | Rogers |
| D576,723 S | 9/2008 | Achen |
| D578,633 S | 10/2008 | Schluter et al. |
| D581,487 S | 11/2008 | Wildfang |
| D582,029 S | 12/2008 | Achen |
| D589,605 S | 3/2009 | Reedy et al. |
| D597,653 S | 8/2009 | Calkins |
| 7,568,659 B2 * | 8/2009 | Roques ................ B64C 1/1407 244/121 |
| D606,183 S | 12/2009 | Rosenbohm |
| D607,989 S | 1/2010 | Llana Garcia |
| D614,753 S | 4/2010 | Defelice |
| D614,754 S | 4/2010 | Defelice et al. |
| 7,997,533 B2 | 8/2011 | Muller |
| 8,201,775 B2 | 6/2012 | Treimer et al. |
| 8,393,577 B2 * | 3/2013 | Roth ...................... B64C 1/066 244/118.5 |
| 8,397,352 B2 | 3/2013 | Langediers et al. |
| 8,460,419 B1 | 6/2013 | Hobbs |
| D693,756 S | 11/2013 | Stevens |
| 8,651,924 B1 | 2/2014 | Jones et al. |
| 8,696,418 B1 | 4/2014 | Griffin |
| 8,714,483 B2 | 5/2014 | Hoetzeldt et al. |
| D718,434 S | 11/2014 | Diamond |
| D723,675 S | 3/2015 | Paskow |
| D726,093 S | 4/2015 | Perkins et al. |
| 9,061,566 B2 | 6/2015 | Hoehn |
| 9,233,747 B2 | 1/2016 | Perkins et al. |
| 2003/0168553 A1 | 9/2003 | Diehl et al. |
| 2003/0222175 A1 | 12/2003 | Movsesian et al. |
| 2004/0172889 A1 | 9/2004 | Eijkelenberg et al. |
| 2005/0202692 A1 | 9/2005 | Zeuner et al. |
| 2006/0102571 A1 | 5/2006 | Foy et al. |
| 2006/0240765 A1 | 10/2006 | Cheng |
| 2008/0308705 A1 | 12/2008 | Sharp et al. |
| 2009/0008502 A1 | 1/2009 | Lynas |
| 2009/0179110 A1 | 7/2009 | Leyens |
| 2010/0096500 A1 | 4/2010 | Benthien |
| 2010/0101176 A1 | 4/2010 | Metham |
| 2010/0187358 A1 | 7/2010 | Voss et al. |
| 2010/0320318 A1 | 12/2010 | Roth et al. |
| 2011/0041293 A1 | 2/2011 | Langediers et al. |
| 2012/0043421 A1 | 2/2012 | Voss et al. |
| 2012/0234973 A1 | 9/2012 | Hoetzeldt et al. |
| 2013/0075525 A1 | 3/2013 | Roth |
| 2013/0139374 A1 | 6/2013 | Eilken et al. |
| 2014/0082977 A1 | 3/2014 | Pilon |
| 2014/0325824 A1 | 11/2014 | Pacini et al. |
| 2015/0087217 A1 | 3/2015 | Switzer et al. |
| 2015/0115102 A1 | 4/2015 | Perkins et al. |
| 2015/0115103 A1 | 4/2015 | Perkins et al. |

FOREIGN PATENT DOCUMENTS

| | | |
|---|---|---|
| DE | 20121449 U1 | 9/2002 |
| EP | 0905018 B1 | 3/1999 |
| GB | 2312740 A | 5/1997 |

OTHER PUBLICATIONS

International Search Report and Written Opinion issued in International Application No. PCT/US2014/050645, mailed on Nov. 13, 2014.

International Search Report and Written Opinion issued in International Application No. PCT/US2014/050676, mailed Nov. 11, 2014.

International Search Report and Written Opinion of International Application No. PCT/US2014/038606, Mar. 11, 2015, 13 pages.

* cited by examiner

DECOMPRESSION PANEL ASSEMBLY AND METHOD OF EQUALIZING AIR PRESSURE DIFFERENTIAL

CROSS REFERENCE TO RELATED APPLICATIONS

This application claims priority to U.S. Provisional Application No. 61/891,954 filed Oct. 17, 2013, which is hereby incorporated by reference in its entirety.

BACKGROUND

The present disclosure relates generally to decompression panels for use with aircraft and, more particularly, to methods of equalizing air pressure differential in an aircraft.

At least some known aircraft include an opening defined between a passenger compartment and an adjacent compartment to equalize pressure differences during a decompression event. There are at least two known ways to cover the opening: a grille and/or a panel. At least some known decompression grilles include louvers that enable air to pass through the opening during normal operation and/or during a decompression event. However, such louvers can increase an overall weight, manufacturing costs, cleaning costs, and/or cabin noise. Known decompression panels overcome some of the drawbacks of grilles, but may have other disadvantages. For example, although decompression panels may weigh less than grilles, may be easier to clean, and/or inhibit cabin noise, decompression panels are designed to separate from the sidewall of the cabin during a decompression event and require time and labor to be reinstalled. There are several known mechanisms that enable the panel to separate from the sidewall, including pawl latches, breakaway zones, and releasable clips, most of which require replacement prior to the panel being reinstalled.

BRIEF SUMMARY

In one aspect, a decompression panel assembly for equalizing air pressure differential is provided. The decompression panel assembly includes a panel comprising an opening defined therein, a vent cover coupled across the opening, and a latching mechanism. The vent cover is configured to move between a first position and a second position. The latching mechanism is configured to maintain the vent cover in the first position when a pressure differential across the panel is below a predetermined value and facilitate the vent cover moving to the second position when the pressure differential across the panel exceeds the predetermined value.

In another aspect, a method of equalizing an air pressure differential is provided. The method includes maintaining a vent cover in a first position using a latching mechanism when a pressure differential across a panel is below a predetermined value. The vent cover is coupled across an opening defined in the panel. The method also includes releasing the vent cover using the latching mechanism when the pressure differential across the panel exceeds the predetermined value and telescoping the vent cover to a second position to facilitate equalizing the pressure differential across the panel.

In yet another aspect, a pressure equalization panel is provided. The pressure equalization panel includes at least one telescoping vent cover configured to move from a stowed position to a deployed position when a pressure differential changes across the panel.

DETAILED DESCRIPTION

Figure 1:
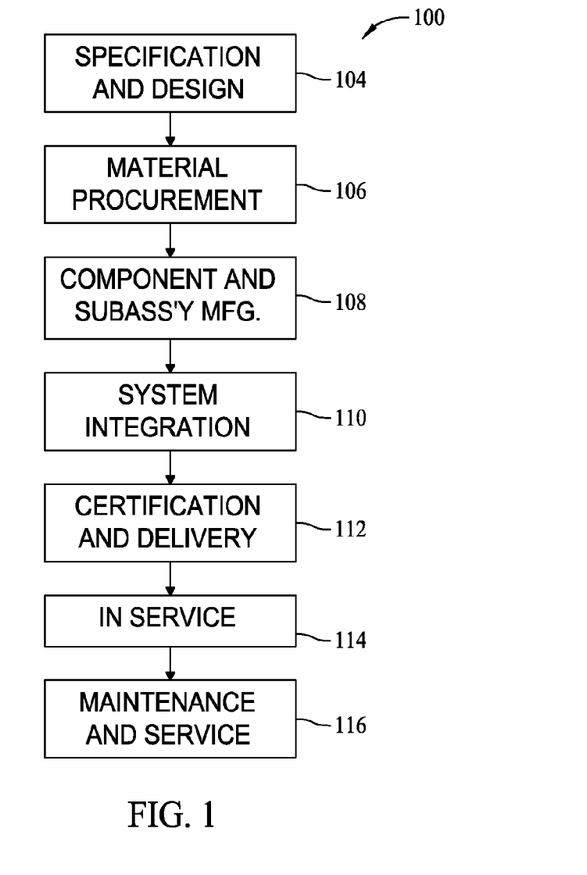
FIG. 1 is a flow diagram of an exemplary aircraft production and service methodology.
Figure 2:
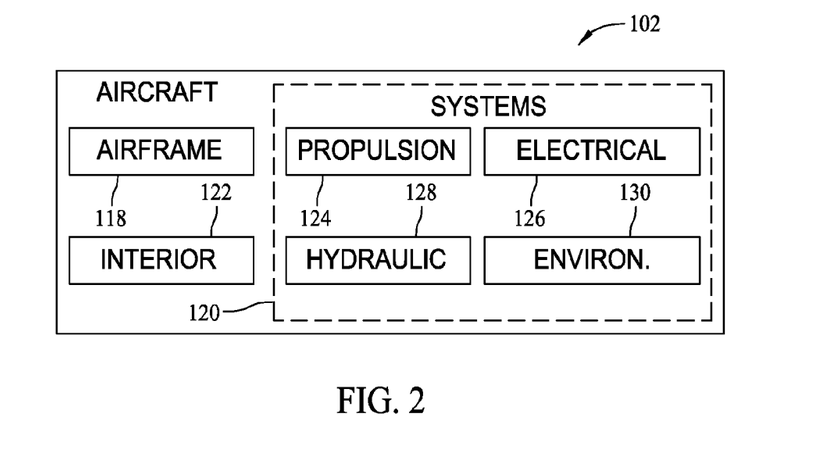
FIG. 2 is a block diagram of an exemplary aircraft that may be fabricated using the system shown in FIG. 1.

FIG. 1 is a flow diagram of an exemplary aircraft production and service methodology. FIG. 2 is a block diagram of an exemplary aircraft that may be fabricated using the system shown in FIG. 1. The methods and systems described herein are in the context of aircraft manufacturing and service method 100 and an aircraft 102. Alternatively, the methods and systems described herein may be implemented in any context and/or in any environment involving a fluid distribution system. During pre-production, method 100 may utilize specification and design 104 of aircraft 102 and/or material procurement 106. During production, component and subassembly manufacturing 108 and system integration 110 of aircraft 102 occurs. Thereafter, aircraft 102 may go through certification and delivery 112 prior to being placed in service 114. While in service by a customer, aircraft 102 is scheduled for routine maintenance and service 116 (including, for example, modification, reconfiguration, and/or refurbishment).

Each of the processes of method 100 may be performed or carried out by a system integrator, a third party, and/or an operator (e.g., a customer). For the purposes of this description, a system integrator may include, without limitation, any number of aircraft manufacturers and major-system subcontractors; a third party may include without limitation any number of venders, subcontractors, and suppliers; and an operator may be an airline, leasing company, military entity, service organization, and so on.

An aircraft 102 produced using method 100 may include an airframe 118 having a plurality of systems 120 and an interior 122. Exemplary high-level systems 120 may include a propulsion system 124, an electrical system 126, a hydraulic system 128, and/or an environmental system 130. Any number of other systems may be included. Although an aerospace example is shown, the principles of the invention may be applied to other industries, such as the automotive industry, machinery, heavy equipment, and heating, ventilation, and air conditioning (HVAC) applications.

The apparatus and methods embodied herein may be employed during any one or more of the stages of production and service method 100. For example, components or subassemblies corresponding to production process 108 may be fabricated or manufactured in a manner similar to components or subassemblies produced while aircraft 102 is in service. Also, one or more apparatus implementations, method implementations, or a combination thereof may be utilized during production stages 108 and 110, for example, by substantially expediting assembly of or reducing the cost of aircraft 102. Similarly, one or more of apparatus implementations, method implementations, or a combination thereof may be utilized while aircraft 102 is in service, for example and without limitation, to maintenance and service 116.

Figure 3:
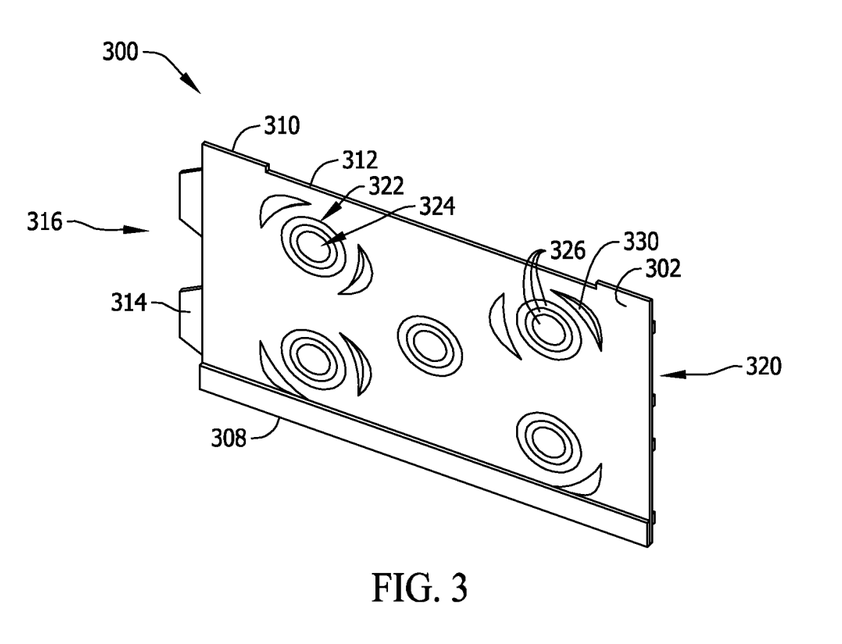
FIG. 3 is a perspective view of a first-side surface of an exemplary decompression panel assembly in a stowed position that may be used in the aircraft shown in FIGS. 1 and 2.
Figure 4:
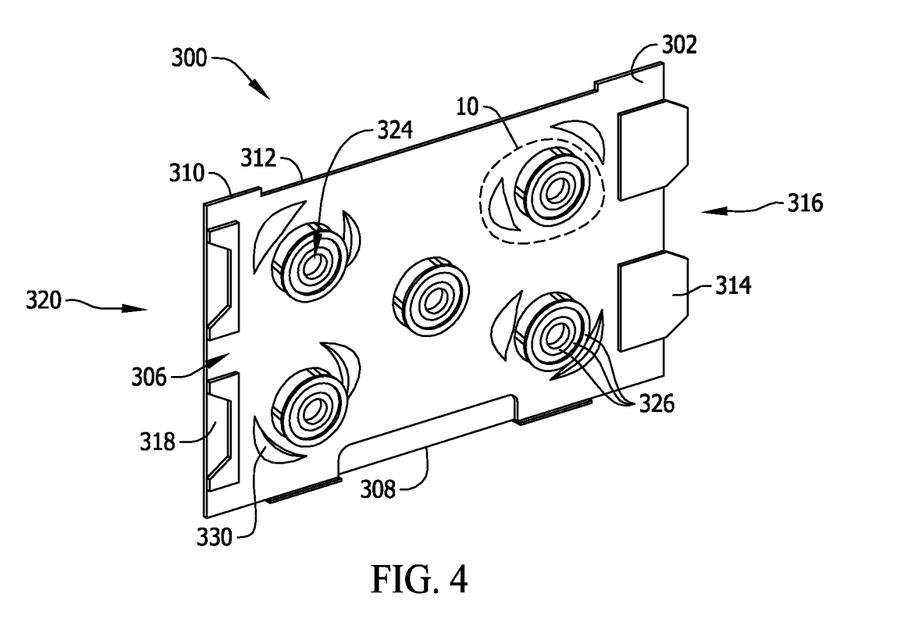
FIG. 4 is a perspective view of a second-side surface of the decompression panel assembly shown in FIG. 3 in the stowed position.
Figure 5:
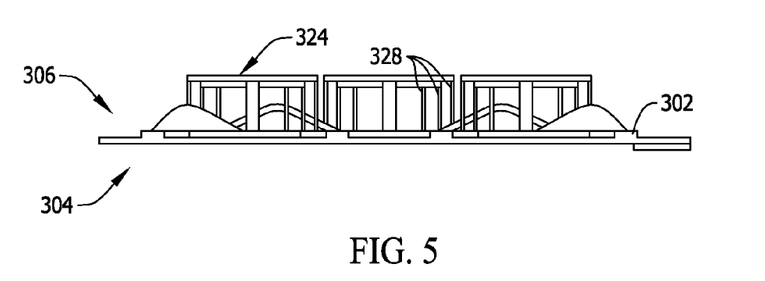
FIG. 5 is a side view of the second-side surface of decompression panel assembly shown in FIG. 3 in the stowed position.
Figure 6:
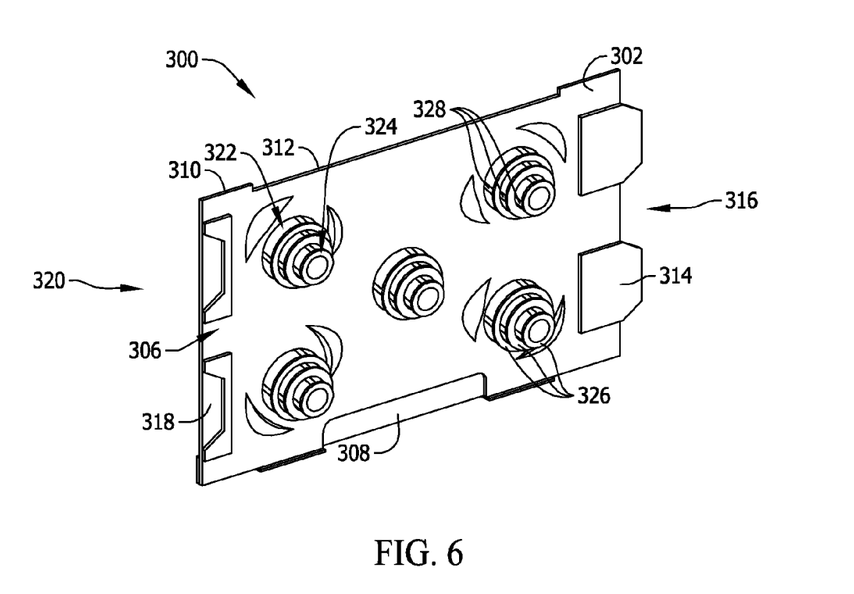
FIG. 6 is a perspective view of the second-side surface of the decompression panel assembly shown in FIG. 3 in a deployed position.
Figure 7:
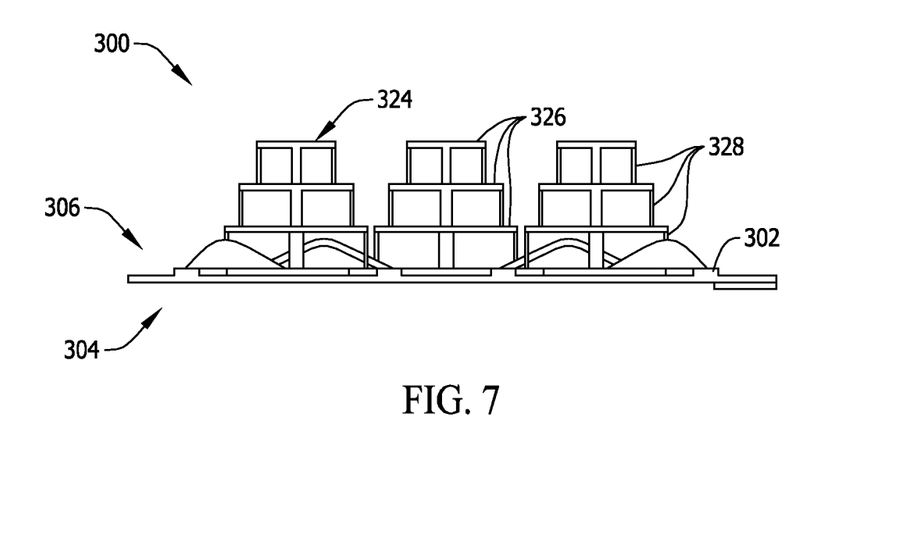
FIG. 7 is a side view of the second-side surface of the decompression panel assembly shown in FIG. 3 in the deployed position.
Figure 8:
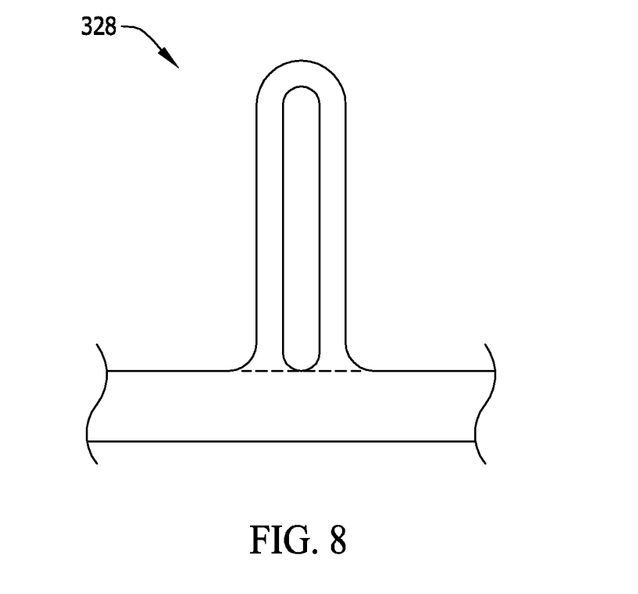
FIG. 8 is an enlarged side view of an exemplary track that may be used with the vent cover shown in FIGS. 3-7.

FIG. 3 is a perspective view of a first-side surface of an exemplary decompression panel assembly 300 in a stowed position for use in aircraft 102 (shown in FIGS. 1 and 2). FIG. 4 is a perspective view of a second-side surface of decompression panel assembly 300 in the stowed position. FIG. 5 is a side view of the second-side surface of decompression panel assembly 300 in the stowed position. FIG. 6 is a perspective view of a second-side surface of decompression panel assembly 300 in a deployed position. FIG. 7 is a side view of the second-side surface of decompression panel assembly 300 in the deployed position. In the exemplary implementation, panel assembly 300 includes a panel 302 having a first-side surface 304 and a second-side surface 306. First-side surface 304 is inboard of an outer skin (not shown) of aircraft 102, and forms a portion of an interior cabin wall. Second-side surface 306 faces outboard and is adjacent to the aircraft skin. A bottom portion 308 of panel 302 is coupled to a floor (not shown) within the aircraft cabin. A top portion 310 of panel 302 includes a lip 312 that couples to a cabin sidewall system (not shown) within aircraft 102. At least one tab 314 extrudes outward from a first end 316 of panel 302 and at least one tab-shaped void 318 is defined at a second end 320 of panel 302, thus enabling multiple panel assemblies 300 to be coupled together.

In the exemplary implementation, panel assembly 300 includes at least one vent opening 322 defined therein and a vent cover 324 coupled over vent opening 322. During normal flight conditions of aircraft 102, vent cover 324 is positioned in a first, stowed position (FIGS. 3-5) and is moveable to a second, deployed position (FIGS. 6 and 7) during a decompression event. As used herein, a decompression event is defined as when a pressure differential across panel 302 exceeds a predetermined value, also referred to as a "threshold". When in the stowed position, vent cover 324 extends over vent opening 322 to form a substantially continuous surface along first side surface 304 of panel assembly 300. In the exemplary implementation, vent opening 322 and vent cover 324 are each substantially circular. However, in alternative implementations, either vent opening 322 and/or vent cover 324 may have any other shape that enables panel assembly 300 to function as described herein. In one implementation, panel assembly 300 includes a plurality of vent openings 322 that each have a respective vent cover 324 to enable pressure differential to equalize more quickly during a decompression event.

In the exemplary implementation, vent cover 324 includes a plurality of substantially concentrically-aligned rings 326 that are coupled together by tracks 328. Rings 326 each have a different diameter and are substantially co-planar relative to one other when vent cover 324 is in the stowed position. When a decompression event occurs, rings 326 and tracks 328 extend outboard from second-side surface 306 of panel 302 in a telescoping motion to move vent covers 324 to the deployed position. To enable vent cover 324 to telescope, tracks 328 slide in the outboard direction, thus enabling rings 326 to separate axially from each other.

Panel assembly 300 also includes at least one air vent opening 330 defined therein that enables airflow through the cabin and provides a pathway for a latching mechanism 400 (not shown in FIGS. 3-7) to actuate. Air vent opening 330 may include a grille, a louver, or a domed opening. In the exemplary implementation, flap device 404 covers air vent opening 330 and a decompression event causes flap device 404 to rotate when the pressure differential of the air across opening 330 exceeds a predetermined value, thus unlocking rings 326. In alternative implementations, panel assembly 300 may include any latching mechanism that enables axial movement of vent cover 324 as described herein.

Figure 9:
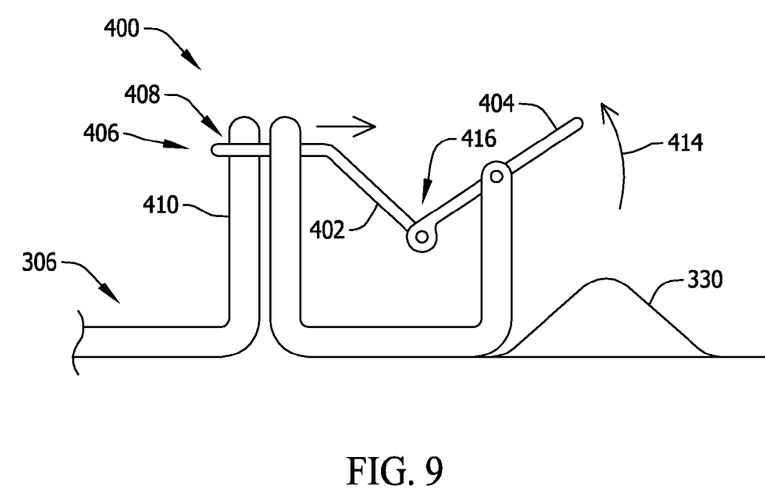
FIG. 9 is a side view of an exemplary latching mechanism that may be used with the decompression panel assembly shown in FIGS. 3-7.
Figure 10:
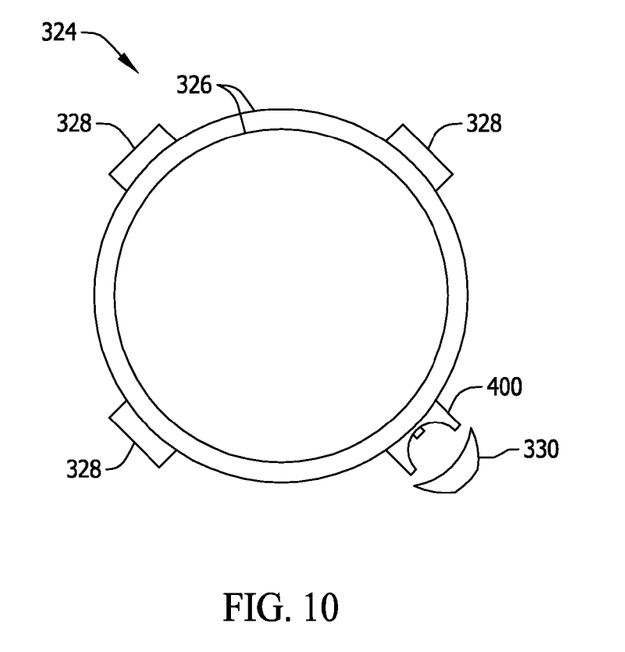
FIG. 10 is a detail view of an exemplary vent cover coupled to the latching mechanism shown in FIG. 9.
Figure 11:
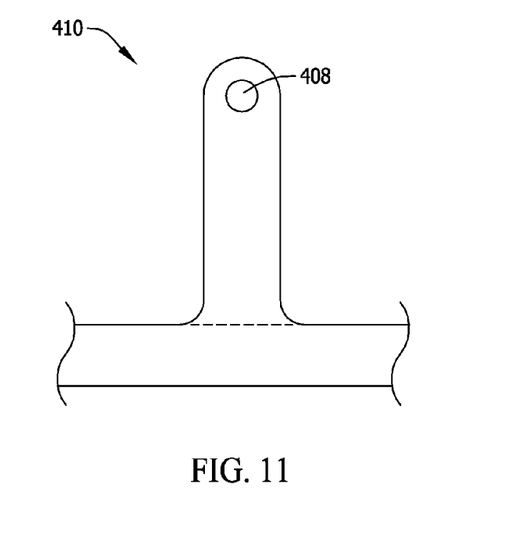
FIG. 11 is an enlarged side view of an exemplary locking tab that may be used with the latching mechanism shown in FIG. 9.

FIG. 9 is a side view of an exemplary latching mechanism 400 that may be used with decompression panel assembly 300 (shown in FIGS. 3-7). FIG. 10 is a detail view of an exemplary vent cover 324 showing an area 10 (shown in FIG. 4) and coupled to latching mechanism 400. FIG. 11 is an enlarged side view of an exemplary locking tab 410 that may be used with latching mechanism 400. Latching mechanism 400 is configured to maintain vent cover 324 in a first position when a pressure differential across panel 302 is below a predetermined value and facilitate vent cover 324 moving to a second position when the pressure differential across panel 302 exceeds the predetermined value.

In the exemplary implementation, latching mechanism 400 maintains rings 326 substantially co-planar relative to one another when vent cover 324 is in the stowed position. Latching mechanism 400 is positioned on second-side surface 306 of panel 302. In the exemplary implementation, latching mechanism 400 includes a rotatable pin 402 that is coupled to a flap device 404. In alternative implementations, latching mechanism 400 may include any suitable mechanical latch that enables panel assembly 300 to function as described herein. A first end 406 of pin 402 is inserted into a hole 408 defined in locking tab 410 of vent cover 324. Pin 402 secures vent cover 324 in the stowed position when positioned in locking tab 410.

A second end 412 of pin 402 is coupled to flap device 404. Flap device 404 slides pin 402 from hole 408 when the pressure differential across panel assembly 300 increases above a predetermined value in aircraft 102. More specifically, flap device 404 is hingedly coupled to pin 402 and pulls pin 402 from hole 408 as flap device 404 rotates. The predetermined value is determined at least partially by flap device 404 geometry and hinge stiffness of flap device 404. When a decompression event occurs, the pressure differential of air flowing through air vent opening 330 forces flap device 404 to rotate in direction 414. As flap device 404 rotates, pin 402 moves in a direction 416 and slides from hole 408. Vent cover 324 is then unlocked and can move in the outboard direction. In one implementation, panel assembly 300 includes a plurality of vent openings 322 that each include a respective vent cover 324. Each vent cover 324 has a respective latching mechanism 400 coupled thereto.

During operation, when pressure differential of aircraft 102 is normal, vent covers 324 are in the stowed position where each vent cover 324 is substantially flush with first-side surface 304 of the cabin wall. Locking pin 402 secures vent cover 324 in the stowed position. When decompression of aircraft 102 occurs, vent covers 324 slide outboard towards the skin of aircraft 102. More specifically, rings 326 of each vent cover 324 slide outwardly on tracks 328 that couple rings 326 to panel 302. During decompression, a pressure differential forms between the inboard and outboard sides of panel 302, causing flap device 404 to rotate outboard. Rotation of flap device 404 removes locking pin 402 from vent cover 324, enabling rings 326 to telescope outwardly on tracks 328. Telescoping of vent covers 324 facilitates equalization of the pressure differential in aircraft 102. During normal operations, vent covers 324 are substantially flush with front-side surface 304 of panel 302 to facilitate cleaning. Panel assembly 300 is tamper resistant because there is minimal tolerance between vent cover 324 and panel 302. Any non-centered force is directed against tracks 328, while a centered force is resisted by the shear strength of latching mechanism 400.

Figure 12:
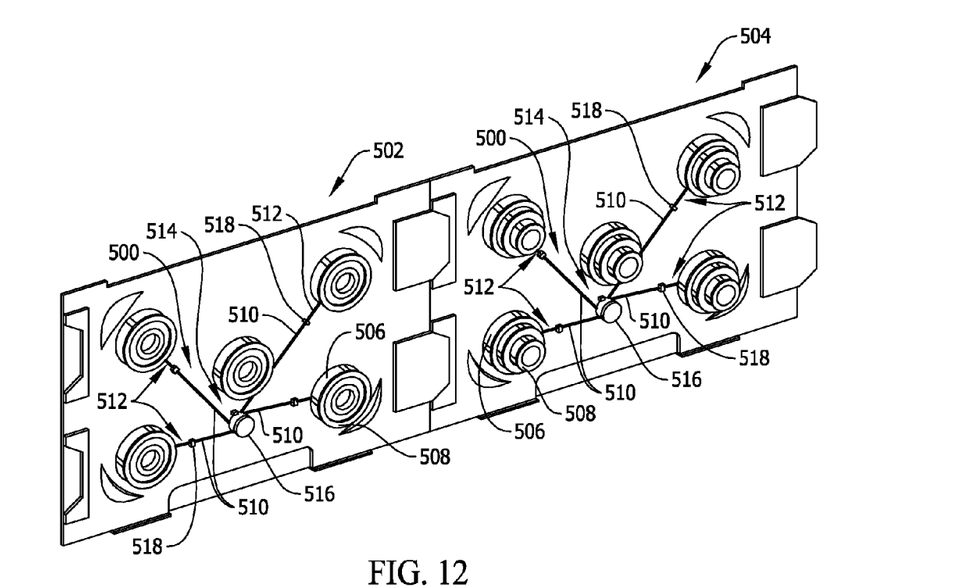
FIG. 12 is a perspective view of an alternative latching mechanism coupled to a stowed decompression panel assembly and a deployed decompression panel assembly.

FIG. 12 is a perspective view of an alternative latching mechanism 500 coupled to a stowed decompression panel assembly 502 and a deployed decompression panel assembly 504. In the exemplary implementation, panel assemblies 502 and 504 include vent openings 506, each having a respective vent cover 508. Latching mechanism 500 is a single latching mechanism that actuates all vent covers 508 of stowed panel assembly 502. Latching mechanism 500 includes a plurality of links 510, each having a first end 512 and a second end 514, and a spring-loaded hub 516. Each first end 512 is coupled to a pin of each respective vent cover 508. Each second end 514 is coupled to hub 516. A pressure differential change across stowed decompression panel assembly 502 causes hub 516 to rotate and wrap links 510 at least partially about hub 516. As hub 516 rotates, a length of each link 510 is shortened, causing pin 518 to be removed from each vent cover 508. Vent covers 508 deploy to equalize the pressure differential, as shown in deployed decompression panel assembly 504.

A method of equalizing an air pressure differential includes maintaining vent cover 324 in a first position using latching mechanism 400 when a pressure differential across panel 302 is below a predetermined value. Vent cover 324 is coupled across opening 322 defined in panel 302. The method further includes releasing vent cover 324 using latching mechanism 400 when the pressure differential across panel 302 exceeds the predetermined value and telescoping vent cover 324 to a second position to facilitate equalizing the pressure differential across panel 302.

Vent cover 324 includes a plurality of substantially concentrically-aligned rings 326 that each have a different diameter. The method further includes axially separating plurality of rings 326 from each other.

Latching mechanism 400 includes pin 402 coupled to flap device 404 adjacent vent 330 defined through 302 panel. The method further comprises rotating flap device 404 relative to panel 302 when the pressure differential increases above the predetermined value. The predetermined value is determined at least partially by a geometry and hinge stiffness of flap device 404. The method further includes rotating pin 402 from hole 408 defined in tab 410 coupled to vent cover 324.

A pressure equalization panel 302 includes at least one telescoping vent cover 324 configured to move from a stowed position to a deployed position when a pressure differential changes across panel 302.

Panel 302 further includes latching mechanism 400 coupled in flow communication to at least one vent 330 defined through panel 302 and coupled to at least one telescoping vent cover 324. Latching mechanism 400 includes flap device 404 hingedly coupled to pin 402. Latching mechanism 400 is configured to maintain at least one telescoping vent cover 324 in the stowed position using pin 402 while a pressure differential across panel 302 is below a predetermined value. Latching mechanism 400 is further configured to rotate flap device 404 to remove pin 402 from at least one telescoping vent cover 324 when the pressure differential across panel 302 exceeds the predetermined value to facilitate at least one telescoping vent cover 324 moving to the deployed position.

The implementations described herein provide a decompression panel assembly that facilitates equalization of pressure differential in an aircraft. Because the decompression panel assembly does not separate from a cabin sidewall of the aircraft during a pressure differential change, it does not become a hazard in the cabin. Moreover, during normal operations, vent covers of the decompression panel assembly are substantially flush with a front-side surface of the panel to facilitate cleaning. The panel assembly is tamper resistant because there is minimal tolerance between the vent cover and the panel. Any non-centered force is directed against the tracks, while a centered force is resisted by the shear strength of the latching device. Additionally, the panel assembly facilitates a significant weight reduction in an aircraft, which increases efficiency and reduces costs. Because the panel assembly does not require louvers, noise within the aircraft cabin is reduced. Moreover, because the decompression panel assembly does not separate from the sidewall upon occurrence of a decompression event, time and labor associated with maintenance and resetting of the panel assembly are also reduced. The absence of persistent air openings that are presented by known louvered grilles results in the panel assemblies described herein having superior noise attenuation as compared to such known louvered grilles.

A technical effect of the systems and methods described herein includes at least one of: (a) maintaining a vent cover in a first position using a latching mechanism when a pressure differential across a panel is below a predetermined value, wherein the vent cover is coupled across an opening defined in the panel; (b) releasing the vent cover using the latching mechanism when the pressure differential across the panel exceeds the predetermined value; and (c) telescoping the vent cover to a second position to facilitate equalizing the pressure differential across the panel.

The implementations described herein relate generally to decompression panels and, more particularly, to decompression panel assemblies and methods for equalizing air pressure differential. Exemplary implementations of decompression panel assemblies and methods for equalizing air pressure differential are described above in detail. The methods and systems are not limited to the specific implementations described herein, but rather, components of systems and/or steps of the method may be utilized independently and separately from other components and/or steps described herein. Each method step and each component may also be used in combination with other method steps and/or components. Although specific features of various implementations may be shown in some drawings and not in others, this is for convenience only. Any feature of a drawing may be referenced and/or claimed in combination with any feature of any other drawing.

An element or step recited in the singular and proceeded with the word "a" or "an" should be understood as not excluding plural elements or steps unless such exclusion is explicitly recited. Moreover, references to "one implementation" of the present invention and/or the "exemplary implementation" are not intended to be interpreted as excluding the existence of additional implementations that also incorporate the recited features.

This written description uses examples to disclose the implementations, including the best mode, and also to enable any person skilled in the art to practice the implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A decompression panel assembly comprising:
    a panel comprising an opening defined therein;
    a vent cover coupled across said opening, said vent cover configured to move between a first position and a second position, said vent cover comprising a plurality of substantially concentrically-aligned rings that are aligned substantially co-planar relative to each other when said vent cover is in the first position; and
    a latching mechanism configured to maintain said vent cover in the first position when a pressure differential across said panel is below a predetermined value and facilitate the vent cover moving to the second position when the pressure differential across said panel exceeds the predetermined value.

2. An assembly in accordance with claim 1, wherein said plurality of substantially concentrically aligned rings each have a different diameter.

3. An assembly in accordance with claim 2, wherein said plurality of rings are axially separated relative to each other when said vent cover is in the second position.

4. An assembly in accordance with claim 2, wherein said plurality of rings are coupled together by tracks that enable the plurality of rings to axially separate.

5. An assembly in accordance with claim 1, wherein said vent cover comprises a tab having a hole defined therethrough.

6. An assembly in accordance with claim 5, wherein said latching mechanism comprises a pin sized to be inserted into the hole when said vent cover is in the first position.

7. An assembly in accordance with claim 6, further comprising at least one vent defined through said panel and adjacent to said panel opening.

8. An assembly in accordance with claim 7, wherein said latching mechanism further comprises a flap device coupled to said pin and to said panel, said latching mechanism adjacent to said at least one vent.

9. An assembly in accordance with claim 8, wherein said flap device is rotatable relative to said panel when the pressure differential increases above the predetermined value.

10. An assembly in accordance with claim 8, wherein said flap device is hingedly coupled to said pin and is configured to rotate said pin from said hole when the pressure differential increases above the predetermined value.

11. An assembly in accordance with claim 1, wherein said panel defines a plurality of openings, said assembly further comprising a vent cover coupled across each of the plurality of openings.

12. An assembly in accordance with claim 11, wherein said latching mechanism comprises a hub and a plurality of links coupled to said hub.

13. An assembly in accordance with claim 12, wherein each of the plurality of links is coupled to a pin of each respective vent cover.

14. An assembly in accordance with claim 13, wherein when the pressure differential increases above the predetermined value, said hub is configured to rotate and wrap the links about the hub to remove said pins from said plurality of vent covers.

15. A method of equalizing an air pressure differential, said method comprising:
    maintaining a vent cover including a plurality of substantially concentrically-aligned rings that are aligned co-planar relative to each other in a first position using a latching mechanism when a pressure differential across a panel is below a predetermined value, the vent cover coupled across an opening defined in the panel;
    releasing the vent cover using the latching mechanism when the pressure differential across the panel exceeds the predetermined value; and
    telescoping the vent cover to a second position to facilitate equalizing the pressure differential across the panel.

16. A method in accordance with claim 15, wherein the vent cover includes a plurality of substantially concentrically-aligned rings that each have a different diameter, telescoping the vent cover further comprises axially separating the plurality of rings from each other.

17. A method in accordance with claim 15, wherein the latching mechanism includes a pin coupled to a flap device adjacent a vent defined through the panel, releasing the vent cover further comprises:
    rotating the flap device relative to the panel when the pressure differential increases above the predetermined value, the predetermined value determined at least partially by a geometry and hinge stiffness of the flap device; and
    rotating the pin from a hole defined in a tab coupled to the vent cover.

18. A pressure equalization panel comprising at least one telescoping vent cover configured to move from a stowed position to a deployed position when a pressure differential changes across said panel, said at least one telescoping vent cover comprising a plurality of substantially concentrically-aligned rings coupled across an opening defined in said panel and aligned substantially co-planar relative to each other when said vent cover is in the stowed position.

19. A panel in accordance with claim 18, further comprising a latching mechanism coupled in flow communication to at least one vent defined through said panel and coupled to said at least one telescoping vent cover, said latching mechanism comprising a flap device hingedly coupled to a pin, said latching mechanism configured to:
    maintain said at least one telescoping vent cover in the stowed position using the pin while a pressure differential across said panel is below a predetermined value;
    rotate the flap device to remove the pin from said at least one telescoping vent cover when the pressure differential across said panel exceeds the predetermined value to facilitate said at least one telescoping vent cover moving to the deployed position.

\* \* \* \* \*